Figure 1:
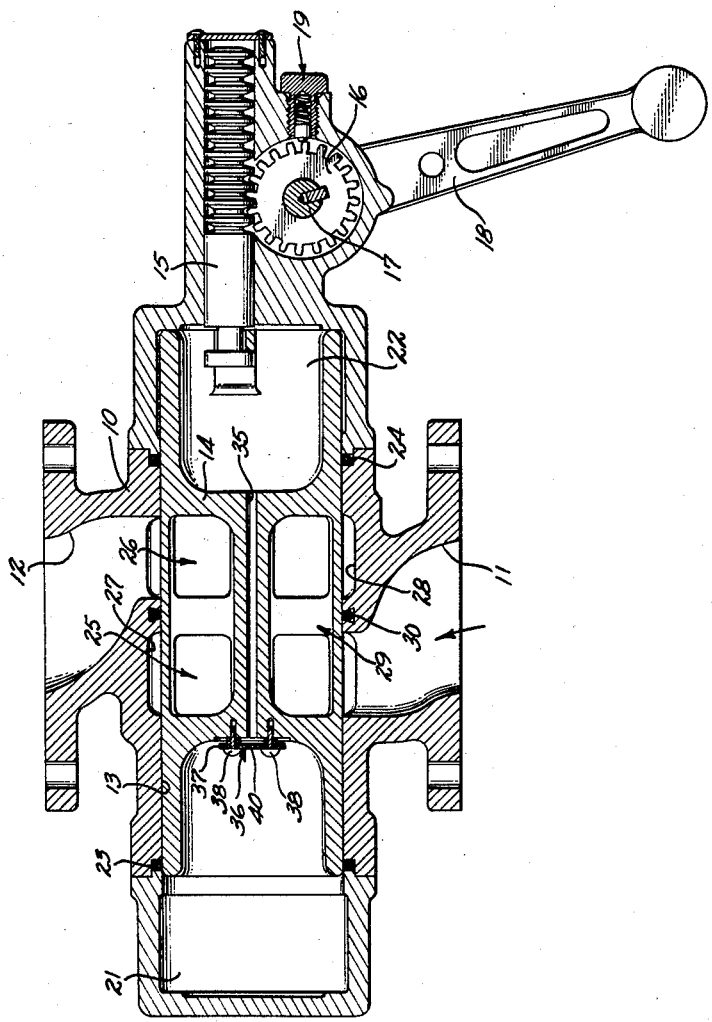

April 5, 1960

R. B. CAMPBELL 2,931,615

VALVE

Filed Oct. 11, 1954

2 Sheets-Sheet 1

INVENTOR.
RODNEY B. CAMPBELL
BY HIS ATTORNEYS.
HARRIS, KIECH, FOSTER & HARRIS

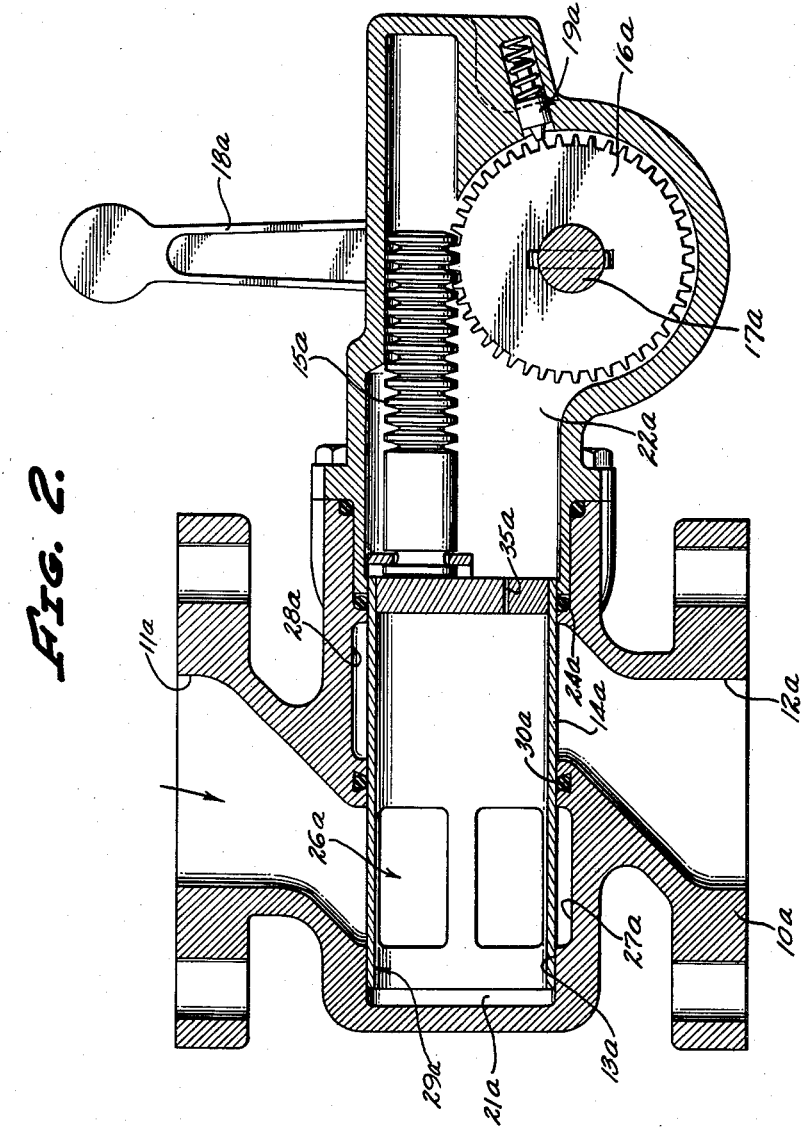

United States Patent Office 2,931,615
Patented Apr. 5, 1960

2,931,615
VALVE

Rodney B. Campbell, Glendale, Calif.

Application October 11, 1954, Serial No. 461,467

2 Claims. (Cl. 251—50)

The present invention relates in general to valves and a primary object of the invention is to provide a valve having means for restricting the rate of movement of a valve element in at least one direction as such valve element is moved between open and closed positions, whereby to prevent pressure surges in a system in which the valve is installed.

More particularly, an object of the invention is to provide a valve having at least a slow closing movement to prevent pressure surges in the system during closing movement of the valve element, other objects being to provide a valve having only a slow closing movement and to provide a valve having both a slow closing movement and a slow opening movement.

Another object is to provide a valve having therein a valve element provided with chambers on opposite sides thereof, there being means of fluid communication between such chambers which regulates the rates of opening and closing movements of the valve element. Related objects are to provide a valve wherein the chambers mentioned are separated from the flow passage through the valve and to provide a valve wherein the chambers mentioned communicate with the flow passage through the valve. In the first instance, the fluid in the chambers may differ from the fluid flowing through the valve, and, in the second instance, the fluid in the chambers is the same as the fluid flowing through the valve.

Another object is to provide a valve wherein the valve element is a piston or piston valve and wherein the chambers mentioned are located at opposite ends of the piston valve, the chambers being interconnected by a passage which by-passes the piston valve, such interconnecting passage preferably being formed in the piston valve.

An object in connection with one embodiment of the invention is to provide a valve having means for providing free fluid communication between the chambers during opening movement of the piston valve, but providing restricted fluid communication therebetween during closing movement of the piston valve so as to limit the rate at which the piston valve may be moved to its closed position, thereby avoiding pressure surges in the system during such movement of the piston valve.

Another object is to provide a valve wherein the passage interconnecting the two chambers has associated therewith valve means for providing free fluid interchange between the chambers during opening movement of the piston valve, such valve means providing restricted fluid communication between the chambers during closing movement of the piston valve.

Another object is to provide a valve wherein the passage interconnecting the chambers mentioned extends centrally through the piston valve from one end thereof to the other, the valve means for respectively providing free and restricted communication between the chambers during opening and closing movement of the piston valve being carried by the piston valve.

Another object is to provide a valve wherein the valve means mentioned includes a valve element adapted to seat on one end of the piston valve and having therethrough a restricted orifice which provides the desired restricted fluid flow between the chambers during closing movement of the piston valve, this valve element unseating during opening movement of the piston valve to provide free fluid interchange between the two chambers.

Various other objects reside in the provision of certain structural features which are described in detail hereinafter and defined in the appended claims and illustrated in the accompanying drawings. Referring to the drawings:

Fig. 1 is a longitudinal sectional view through a valve which embodies the invention; and Fig. 2 is a longitudinal sectional view through another valve which also embodies the invention.

Referring to Fig. 1 of the drawings, the numeral 10 designates a valve body having an inlet port 11 and an outlet port 12 which communicate, at axially spaced points, with a bore 13 for a piston valve 14, the piston valve being movable between open and closed positions by a rack 15 which is connected to the piston valve and which is reciprocable in the valve body 10. Meshed with the rack 15 is a gear 16 on a shaft 17 to which a handle 18 is connected. As will be apparent, by swinging the handle 18 back and forth, the piston valve 14 may be reciprocated in the bore 13 between its open and closed positions. A detent means 19 engageable with the gear 16 maintains the piston valve 14 in whatever position it is placed by the handle 18.

The valve body 10 provides fluid chambers, e.g., air chambers, 21 and 22 at the ends of the piston valve 14, leakage from the ports 11 and 12 into the chambers 21 and 22 being prevented by O-rings 23 and 24 disposed in grooves in the valve body 10 and engaging the piston valve 14 for all positions of the latter.

The piston valve 14 is provided with axially spaced port means 25 and 26, each shown as providing a plurality of ports. The port means 25 and 26 respectively communicate with annular channels 27 and 28 when the piston valve 14 is in its open position, the channels 27 and 28, in turn, communicating with the inlet and outlet ports 11 and 12. The piston valve 14 is provided with passage means 29 therethrough interconnecting the port means 25 and 26 thereof so that, when the piston valve is in its open position, fluid from the inlet port 11 flows to the outlet port 12 by way of the annular channel 27, the port means 25, the passage means 29, the port means 26 and the annular channel 28. When the piston valve 14 is in its closed position, it is displaced leftwardly from the position shown in the drawing to a position such that the port means 26 is out of communication with the channel 28 leading to the outlet port 12. Disposed in a groove in the valve body 10 between the annular channels 27 and 28 is a sealing ring 30 which engages the periphery of the piston valve 14 in an area between the port means 25 and 26 and the right end of the piston valve when the piston valve is in its closed position, thereby preventing fluid leakage between the inlet port 11 and the outlet port 12 when the valve is closed.

The piston valve 14 is provided with a central, axial passage 35 therethrough which interconnects the chambers 21 and 22. Mounted on that end of the piston valve 14 which faces in the direction of closing movement of the piston valve is a valve means 36 which permits free fluid flow between the chambers 21 and 22 during opening movement of the piston valve 14, but which provides for only restricted fluid flow between the chambers 21 and 22 during closing movement of the piston valve, thereby limiting the rate at which the piston valve can be moved to its closed position to avoid pressure surges in any system in which the valve of the invention is connected. The valve means 36 is shown as including a plate 37 which is guided for axial movement relative to the piston valve 14 by pins 38, the plate 37 being adapted to seat on the piston valve 14 over one end of the passage 35 in response to movement of the piston valve 14 toward its closed position. In response to movement of the piston valve 14 toward its open position, the plate 37, also referred to hereinafter as a valve element, automatically unseats to fully open the passage 35. The plate 37 is provided with a restricted orifice 40 therethrough which provides for limited fluid flow through the passage 35 when the plate 37 is seated.

Thus, during closing movement of the piston valve 14, the plate 37 is seated and only restricted fluid flow between the chambers 21 and 22 can take place, thereby limiting the rate of closing movement of the valve. However, during opening movement of the valve, the plate 37 automatically unseats to provide free flow between the chambers 21 and 22 by way of the passage 35, thereby permitting quick opening of the valve.

In the embodiment just described, it will be noted that the chambers 21 and 22 are separted from the flow passage through the valve body 10 for any position of the piston valve 14 so that the fluid in the chambers 21 and 22, which may be air, for example, may differ from the fluid flowing through the flow passage through the valve body. Also, in the embodiment just described, there is free opening movement, but restricted closing movement. In the embodiment described hereinafter and illustrated in Fig. 2 of the drawings, corresponding chambers are not separated from the flow passage so that the same fluid is present in the chambers and the flow passage. Also, in the embodiment hereinafter described, both the opening and closing movements are restricted, although free opening and restricted closing movements may be utilized in this embodiment also if desired.

Referring now to Fig. 2 of the drawings, reference numerals corresponding to those previously employed are utilized wherever possible, differing only in the addition of the suffix "a" thereto. The piston valve 14a, which is shown in its closed position, in Fig. 2 of the drawings, is provided with only a single port means 26a therein, the piston valve being cup-shaped to provide a passage means 29a therein approximately corresponding to the passage means 29 in the piston 14. When the piston valve 14a is in its closed position, as shown, it closes communication between the annular channels 27a and 28a respectively communicating with the inlet port 11a and the outlet port 12a, leakage being prevented by sealing elements 24a and 30a respectively corersponding to the sealing elements 24 and 30. When the piston valve 14a is in its open position, the port means 26a therein registers with the annular channel 28a and the piston valve 14a uncovers the annular channel 27a. Thus, fluid can flow from the inlet port 11a through the annular channel 27a, through the port means 26a, through the piston valve 14a, i.e., the passage means 29a, out the open end of the piston valve, and then into the annular channel 28a leading to the outlet port 12a. Thus, the chamber 21a adjacent the open end of the piston valve 14a is always filled with the fluid flowing through the valve body 10a.

The closed end of the piston valve 14a is provided with a restricted passage 35a therethrough which interconnects the chambers 21a and 22a, these chambers thus always being filled with the fluid flowing through the valve body 10a. The restricted passage 35a limits the rate at which the piston valve can be moved to either its closed position or its open position, thereby avoiding pressure surges in any system in which the valve is connected under either set of conditions.

Although I have disclosed exemplary embodiments of my invention, it will be understood that I do not intend to be limited strictly thereto, except insofar as may be required by the full scope of the claims appended hereto.

I claim as my invention:

1. In a valve, the combination of: a valve body providing a bore and providing inlet and outlet ports which communicate with said bore intermediate the ends thereof, said valve body also providing fluid chambers communicating with the respective ends of said bore; valve means in said bore comprising a single cup-shaped piston valve in said bore and having an end wall and a side wall, said end wall having a restricted passage therethrough providing fluid communication between said fluid chambers, said side wall having port means therethrough which registers with said inlet port in one position of said piston valve in said bore and which registers with said outlet port in another position of said piston valve in said bore, said side wall of said piston valve uncovering one of said ports in said valve body in one position of said piston valve and covering said one port in the other position of said piston valve, said restricted passage connecting said fluid chambers in fluid communication in both of said positions of said piston valve; and means for moving said piston valve between said positions.

2. A valve as defined in claim 1 wherein the means last defined includes mechanical means connected to said end wall of said piston valve.

References Cited in the file of this patent

UNITED STATES PATENTS

| | | |
|---|---|---|
| 870,792 | McAlear | Nov. 12, 1907 |
| 1,995,299 | Foulds | Mar. 26, 1935 |
| 2,029,837 | Schmid | Feb. 4, 1936 |
| 2,059,808 | Robart | Nov. 3, 1936 |
| 2,152,831 | Williams | Apr. 4, 1939 |
| 2,331,527 | Welty | Oct. 12, 1943 |
| 2,526,039 | Oakes | Oct. 17, 1950 |
| 2,651,325 | Lusignan | Sept. 8, 1953 |
| 2,672,158 | Cormany | Mar. 16, 1954 |
| 2,708,452 | Tappin | May 17, 1955 |